United States Patent [19]
Whittaker

[11] Patent Number: 5,762,312
[45] Date of Patent: Jun. 9, 1998

[54] LOAD INDICATING MACHINERY MOUNT PAD

[75] Inventor: Wayne H. Whittaker, Horton, Mich.

[73] Assignee: Unisorb Inc., Jackson, Mich.

[21] Appl. No.: 577,931

[22] Filed: Dec. 22, 1995

[51] Int. Cl.⁶ .................................................. F16M 13/00
[52] U.S. Cl. ................................ 248/633; 248/632
[58] Field of Search ................................ 248/632, 633, 248/634, 678, 615

[56] References Cited

U.S. PATENT DOCUMENTS

| | | | |
|---|---|---|---|
| 2,534,137 | 12/1950 | Lewis | 248/633 X |
| 2,546,394 | 3/1951 | Harmon | 248/633 X |
| 3,311,331 | 3/1967 | Steimen | 248/633 |
| 3,436,042 | 4/1969 | Van Goubergen | 248/633 X |
| 3,845,924 | 11/1974 | Taviere et al. | 248/615 X |
| 4,002,315 | 1/1977 | Van Goubergen | 248/633 |
| 4,281,739 | 8/1981 | Keiser | 248/632 X |
| 5,333,830 | 8/1994 | Millen | 248/679 |

FOREIGN PATENT DOCUMENTS 790874  2/1958  France ..................... 248/633

*Primary Examiner*—Ramon O. Ramirez
*Assistant Examiner*—Anita M. King
*Attorney, Agent, or Firm*—Young & Basile, P.C.

[57] ABSTRACT

A machinery mounting pad for heavy machinery formed of an elastic deformable material having load supporting elements homogeneously defined thereon of various vertical height whereby the extent of compression of the pad elements under a vertical load may be visually observed, and measured, and as the deformation and compression of the pad is known with respect to predetermined magnitudes of load, the weight imposed upon the pad may be approximately determined.

11 Claims, 1 Drawing Sheet

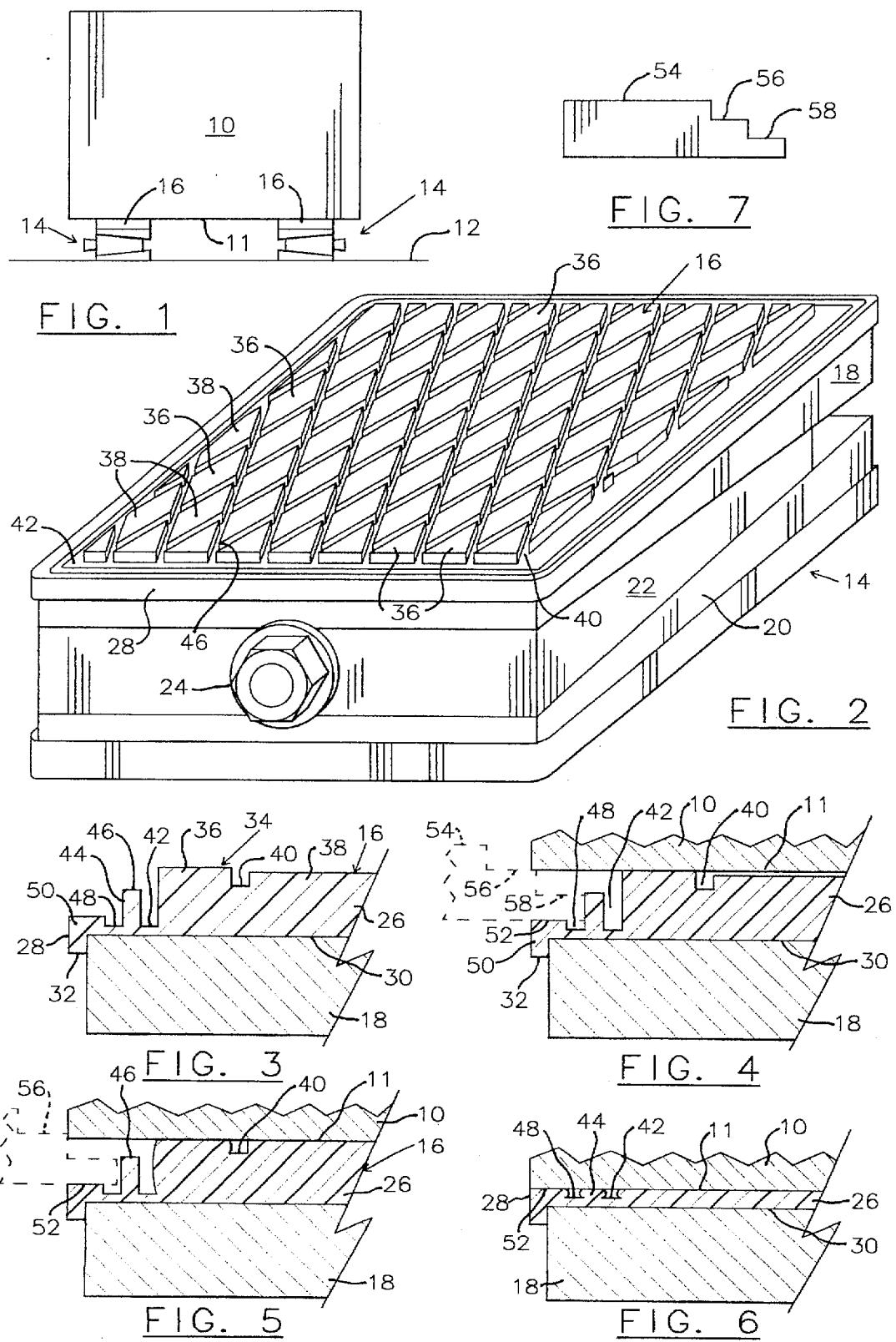

5,762,312

1

LOAD INDICATING MACHINERY MOUNT PAD

BACKGROUND OF THE INVENTION

1. Field of the Invention

The invention pertains to load indicating machinery mounting pads for absorbing machinery vibrations and providing both a measurable and visual indication of the magnitude of weight being supported by the pad.

2. Description of the Related Art

Heavy machinery such as presses, machine tools, turbines, generators, and the like, are usually mounted upon vertically adjustable supports spaced from each other. It is usually desirable that each of the load supporting locations bear a substantially equal amount of the load weight. However, in the past, it has been very difficult to estimate the weight being borne at each location without incorporating a complex scale or the like at such location, and in the past, the distribution of heavy machinery weight evenly has been a trial and error process whose accuracy is mainly determined by the skill and experience of the installer.

Also, it is often desirable to damp and absorb vibrations of heavy machinery during operation, and the supports commonly employ vibration damping apparatus such as rubber pads or the like.

As the access and clearances to the underside of heavy loads is usually limited, it is very difficult to determine the distribution of load weight upon its supports, and heretofore, apparatus has not been available which could, within any practical degree of accuracy, determine the weight supported upon a machinery mounting pad. Also, a weight indicating pad which simultaneously was capable of absorbing vibration has not been available.

OBJECTS OF THE INVENTION

It is an object of the invention to provide a weight or load indicating machinery mount for heavy machinery and the like wherein the mount comprises a deformable pad having weight indicating elements which indicates the degree of pad compression which is proportional to the vertical weight imposed thereon.

Another object of the invention is to provide a weight indicating machinery mount pad of a simple homogeneous construction formed of a resilient deformable material wherein one of the pad surfaces is provided with a plurality of deformable weight supporting elements which sequentially support the weight imposed thereon, and the amount of weight imposed upon the pad can be determined by which elements are deformed, and the extent of deformation.

Yet another object of the invention is to provide a load indicating machinery mount pad of low profile which may be readily used with levelers and other heavy duty machinery supporting apparatus which is economical to manufacture, dependable in operation, capable of absorbing vibration, and capable of indicating the magnitude of weight imposed thereon.

SUMMARY OF THE INVENTION

A weight or load indicating machinery mount pad in accord with the invention consists of a substantially planar body of molded neoprene material. The upper surface of the body is formed by a plurality of vertically extending elements homogeneously formed of the neoprene resilient and deformable material, and the elements are provided with top surfaces which sequentially engage the lower surface of the load depending upon the degree of weight imposed upon the pad.

Preferably, the central region of the pad, which is usually of a rectangular configuration, is provided with upstanding elements separated by valleys or clearances which permit the elements to deform laterally or horizontally under load. These primary load bearing elements may vary slightly in vertical dimension so that lighter loads will be supported on a minimum number of elements for higher efficiencies with respect to vibration absorption.

Secondary load supporting elements, preferably in the form of rings surrounding the primary centrally located elements, are of a height significantly less than that of the primary elements and will only be engaged by the load upon sufficient deformation of the primary elements. The vertical movement or compression that occurs in the pad under load is known for given magnitudes of weight or load, and as by way of example, when the upper surface of the second elements or ring are engaged by the load, this indicates that the load is 5,000 pounds, for instance.

A secondary load supporting ring surrounds the first ring and is of a lesser vertical height whereby the second ring will only be engaged under the highest weight for which the mounting pad is designed. In such instance, the primary supporting elements, and the first auxiliary ring will be fully deformed, and the second ring will be engaged by the load indicating maximum capacity for the pad. The first and second rings are separated by valleys or clearances to permit lateral deflection or "bulging" of the rings under load.

As the first and second rings are mounted adjacent the periphery of the load mounting pad, it is possible to visually observe which rings are being engaged by the load, and a skilled observer can accurately estimate the load on the pad merely by observation. Also, as the compression of the pad is known and proportional to the weight imposed thereon, by the use of feeler gauges, or other measurement devices, it is possible to accurately determine the compression that has occurred in the mounting pad in order to evaluate the magnitude of the load.

Mounting pads in accord with the invention may be mounted upon levelers and other known load supporting devices which provide vertical adjustment, and it is expected that mounting pads in accord with the invention will be associated with known levelers and mounting devices for heavy equipment.

The load indicating machinery mounting pad of the invention may be economically manufactured, is durable and has a long operational life, and permits heavy loads to be firmly supported while absorbing vibrations, and while simultaneously permitting the magnitude of the weight imposed thereon to be determined.

BRIEF DESCRIPTION OF THE DRAWINGS

The aforementioned objects and advantages of the invention will be appreciated from the following description and accompanying drawings wherein:

FIG. 1 is a generally schematic illustration of a typical installation in which the load indicating pads of the invention are utilized, FIG. 2 is a perspective view of a typical use of a mounting pad in accord with the invention as mounted upon a known load leveler, FIG. 3 is a detail elevational sectional view illustrating a mounting pad as mounted upon a support surface, no load being imposed thereon, FIG. 4 is a detail elevational sectional view similar to FIG. 3 illustrating a load of minimum magnitude being supported by the pad, FIG. 5 illustrates a mounting pad in accord with the invention while supporting intermediate weight, FIG. 6 is a detail elevational view similar to FIGS. 3-5 illustrating the configuration of the mounting pad under maximum load conditions, and FIG. 7 is an elevational view of a gauge which may be used to determine the degree of compression of the mounting pad, and the approximate magnitude of the weight being imposed thereon.

DESCRIPTION OF THE PREFERRED EMBODIMENT

The basic environment in which the weight indicating machinery mount pad of the invention is used is illustrated in FIG. 1 wherein a load 10 to be supported upon the pad is schematically illustrated. The load 10 will usually consist of heavy equipment, such as a press, large machine tool, turbine, generator, a turbine/generator set, or the like. The load 10 includes a lower surface 11, and the ground level is illustrated at 12. The load 10 is supported on vertically adjustable levelers and a pair of levelers 14 are illustrated in FIG. 1, and in actual use, the number of levelers 14 employed will be determined by the size and weight of the load 10. The levelers 14 may be of the type sold by the assignee, Unisorb Inc. of Jackson, Mich., under the trademarks LEV-L-INE® and FIXATOR®, and each leveler includes an upper wedge 18, a lower wedge 20, and central longitudinally adjustable wedge 22 interposed therebetween. A nut 24 mounted upon a threaded shaft, not shown, is used to adjust the position of the wedge 22 between wedges 18 and 20 to adjust the vertical dimension of the leveler.

The load indicating machinery mount pad 16 in accord with the invention includes a pad body 26 preferably formed of a molded elastic and resilient high density material such as neoprene. The material of which the pad body 26 is formed must be resilient, and have a predetermined deflection under known weight, and be deformable, yet able to recover deformation upon the load being removed therefrom.

The pad body 26 includes a periphery 28, and in the disclosed embodiment, the pad is of a rectangular configuration of a slightly larger size than the top of the upper wedge 18 of the leveler 14. The pad body 26 includes a planar lower surface 30 which rests upon the leveler wedge 18, and at its periphery 28, the body 26 is provided with an overhanging lower lip 32 which encompasses the upper periphery of the wedge 18 and maintains the body 26 upon the wedge 18.

The upper surface 34 of the pad body 26 consists of a plurality of deformable elements homogeneously formed of the material of the body 26. The upper surface 34 is generally indicated and includes the diamond portions 36, FIG. 2, and the diamond portions 38. The portions 36 and 38 are separated by a clearance or valley 40, and as will be appreciated from FIGS. 3 and 4, the diamond portions 36 are slightly higher, in a vertical direction, than the diamond portions 38. Preferably, the portions 36 and 38 are alternately related to each other defining the central portion of the pad upper surface 34. The difference in the elevations of the portions 36 and 38 provides for range expansion.

A peripheral depression or valley 42 is defined about the portions 36 and 38, and as will be appreciated from FIGS. 3 and 4, the valley 42 is of significant depth and partially defines the ridge 44. The ridge 44 extends about the body 26 adjacent its periphery 28, and the uppermost surface of the ridge is indicated by reference 46.

The "outer" side of the ridge 44 is defined by the valley 48 which extends about the peripheral configuration of the pad body 26, and the valley 48 defines the ridge 50 having an upper surface 52. As will be appreciated from FIGS. 3 and 4, the ridge 50 is of a lesser height than the ridge 44, and the ridge 50 extends to the body periphery 28. Accordingly, it will be appreciated that the pad upper surface 34, in its entirety, is defined by the upper surfaces of the portions 36 and 38, and ridge surfaces 46 and 52.

As will be appreciated from FIG. 1, the lower surface 11 of the load 10 engages the pad body upper surface 34. The entire weight of the load 10 will be distributed among its points of support as defined by levelers 14, and usually, it is desirable to distribute the weight of load 10 equally among the levelers and associated pads. With the pad body 26 being mounted upon the upper surface of the leveler wedge 18, all of the weight being borne by each leveler will be transmitted through the associated pad body 26.

FIG. 4 illustrates the configuration of the pad body 26 under light loads. The load lower surface 11 will engage the uppermost portion of the pad upper surface 34, i.e. the upper surface of diamond portion 36, and there will be little lateral deformation occurring in the diamond portions 36 under light loads.

Under medium loads, the pad body 26 will be compressed and begin to deform laterally as shown in FIG. 5. The upper surface of the diamond portions 38 will engage the load surface 11, and as the load surface 11 continues to move downwardly, the diamond portions 36 and 38 begin to deform laterally as shown in FIG. 5. Deformation of the pad body 26 decreases the distance between the lower load surface 11 and the ridge surface 46 in FIG. 5 as compared to this distance as shown in FIG. 4.

Under heavier loads, continued deformation of the pad body 26 will occur, and the load surface 11 will engage the ridge surface 46 whereby the material of the ridge 44 will, additionally, tend to resist pad deformation.

Under the heaviest loads capable of being effectively supported by the pad body 26, as shown in FIG. 6, the load surface 11 will engage the outermost ridge surface 52 and will, of course, also have engaged the ridge surface 46. The ridge 44 will be laterally deformed as will the ridge 50, as shown in FIG. 6.

As the ridge 44 and its surface 46, and the ridge 50 and its surface 52, are located adjacent the periphery of the pad body 26 is possible to visibly observe the distance separating the ridge surface 46 and the load support surface 11, and the ridge surface 52 and the load surface 11. In this manner, an operator adjusting the height of the leveler 14 by rotation of the nut 24 is able to visually observe the amount of vertical deformation of the pad body 26 and thereby determine the approximate weight being borne by the associated leveler and pad body 26.

FIG. 7 illustrates a basic feeler gauge which may be used in conjunction with the load indicating machinery mount pad of the invention wherein the feeler gauge 54 may be formed of a sheet metal material and includes a step 56 and a parallel step 58. By inserting the gauge 54 laterally between the ridge surface 52 and the load surface 11 as in FIG. 4, the operator may quickly determine the approximate dimension between the ridge surface 52 and the load surface 11 thereby quickly determining the weight being borne by the pad 26.

As shown in FIG. 5, heavier weight imposed upon the pad 26 will prevent the gauge 54 from being completely inserted between the ridge surface 52 and the surface 11 indicating that the pad 26 is now bearing a greater weight than that shown in FIG. 4 wherein a lighter weight is being supported.

Of course, the vertical deformation of the pad 26 throughout its operative range is predetermined by initial testing wherein vertical deformation of the pad under load during the various stages is known, and it is therefore possible for the operator by visually observing the relationship of the pad components to the load surface 11, or by using the feeler gauge 54, to closely approximate the weight being supported by each leveler 14. If it is desirable to obtain a very accurate weight determination, a dial indicator gauge capable of reading distances in 0.001 of an inch may be placed against the load surface 11 and the deformation of the pad body 26 very accurately determined, and hence, the weight being borne by the pad very accurately determined.

By the use of machinery mounting pads with each leveler 14, it is possible to accurately distribute the supported weight of load 10 as desired, and by the use of the invention, more accurate supporting characteristics of a load are possible than previously readily achievable, and the low profile and durable characteristics of the pad body 26 permit the load indicating machinery mount pad of the invention to be practical and economically feasible.

It is appreciated that various modifications to the inventive concepts may be apparent to those skilled in the art without departing from the spirit and scope of the invention.

I claim:

1. A weight indicating machinery mont pad for providing vibration absorption and determining if the proper mount pad is being used for the weight of a machine being supported, comprising, in combination, a body of resilient elastic material adapted to support a load and having a lower supported surface, an upper load supporting surface and a periphery, said body being of a generally planar configuration and used in a substantially horizontal orientation, and means for determining the weight supported by said body comprising homogeneous deformable load supporting elements defined on at least one of said surfaces and deformable a predetermined vertical distance under predetermined vertical weight whereby the vertical distance between said body surfaces is proportional to the magnitude of the supported weight.

2. In a weight indicating machinery mounting pad as in claim 1, said deformable load supporting elements being formed on said pad upper load supporting surface.

3. In a weight indicating machinery mounting pad as in claim 1, said one pad surface including a plurality of deformable homogeneous load supporting elements of different vertical height whereby the magnitude of the supported weight is determined by evaluating which elements are deformed.

4. In a weight indicating machinery mounting pad as in claim 3, said plurality of deformable homogeneous load supporting elements being visible when said pad is in use.

5. In a weight indicating machinery mounting pad as in claim 4, said plurality of deformable elements being located adjacent said pad periphery.

6. In a weight indicating machinery mounting pad as in claim 3, a void separating adjacent elements providing clearance to permit said elements to deform under load compression.

7. A weight indicating machinery mount pad for providing vibration absorption and determining if the proper mount pad is being used for the wight of a machine being supported, comprising, in combination, a body of resilient elastic material adapted to support a load and having a lower supported surface, an upper load supporting surface and a periphery, said body being of a generally planar configuration and used in a substantially horizontal orientation, said pad upper lad supporting surface including means for determining the weight supported by said body comprising homogeneous deformable load supporting elements deformable a predetermined vertical distance under predetermined vertical weight whereby the vertical distance between said body surfaces is proportional to the magnitude of the supported weight.

8. In a weight indicating machinery mounting pad as in claim 7, said upper pad surface including a plurality of deformable homogeneous load supporting elements of different vertical height whereby the magnitude of the supported weight is determined by evaluating which elements are deformed.

9. In a weight indicating machinery mounting pad as in claim 8, said plurality of deformable homogeneous load supporting elements being visible when said pad is in use.

10. In a weight indicating machinery mounting pad as in claim 9, said plurality of deformable elements being located adjacent said pad periphery.

11. In a weight indicating machinery mounting pad as in claim 8, a void separating adjacent elements providing clearance to permit said elements to deform under load compression.

* * * * *